(12) United States Patent
Levy

(10) Patent No.: US 7,577,708 B2
(45) Date of Patent: Aug. 18, 2009

(54) METHOD FOR DISCOURAGING UNSOLICITED BULK EMAIL

(76) Inventor: Doron Levy, 12 Beit Zuri Street, 69122 Tel Aviv (IL)

( * ) Notice: Subject to any disclaimer, the term of this patent is extended or adjusted under 35 U.S.C. 154(b) by 114 days.

(21) Appl. No.: 11/008,111

(22) Filed: Dec. 10, 2004

(65) Prior Publication Data

US 2006/0168019 A1 Jul. 27, 2006

(51) Int. Cl.
G06F 15/16 (2006.01)

(52) U.S. Cl. .................................................. 709/206

(58) Field of Classification Search ......... 709/204–207; 705/76, 60; 455/410
See application file for complete search history.

(56) References Cited

U.S. PATENT DOCUMENTS

| | | | | |
|---|---|---|---|---|
| 5,771,289 | A * | 6/1998 | Kuzma | 713/153 |
| 5,893,903 | A * | 4/1999 | Eisdorfer et al. | 705/1 |
| 5,999,967 | A * | 12/1999 | Sundsted | 709/206 |
| 6,192,114 | B1 * | 2/2001 | Council | 379/114.14 |
| 6,453,327 | B1 * | 9/2002 | Nielsen | 715/500 |
| 6,587,550 | B2 | 7/2003 | Council et al. | |
| 6,697,462 | B2 | 2/2004 | Raymond | |
| 7,072,943 | B2 * | 7/2006 | Landesmann | 709/206 |
| 7,085,745 | B2 * | 8/2006 | Klug | 705/401 |
| 7,149,778 | B1 * | 12/2006 | Patel et al. | 709/206 |
| 2001/0023432 | A1 * | 9/2001 | Council et al. | 709/206 |
| 2002/0007453 | A1 * | 1/2002 | Nemovicher | 713/155 |
| 2002/0052855 | A1 * | 5/2002 | Landesmann | 705/400 |
| 2003/0018724 | A1 * | 1/2003 | Mathewson et al. | 709/206 |
| 2003/0191969 | A1 * | 10/2003 | Katsikas | 713/201 |
| 2004/0093371 | A1 * | 5/2004 | Burrows et al. | 709/201 |
| 2004/0128353 | A1 * | 7/2004 | Goodman et al. | 709/204 |
| 2004/0158540 | A1 | 8/2004 | Zuo | |
| 2004/0165707 | A1 | 8/2004 | Raymond | |
| 2004/0215721 | A1 * | 10/2004 | Szeto et al. | 709/204 |
| 2004/0260778 | A1 * | 12/2004 | Banister et al. | 709/206 |
| 2005/0071229 | A1 * | 3/2005 | Mashinsky et al. | 705/14 |
| 2005/0102526 | A1 * | 5/2005 | Davey et al. | 713/188 |
| 2005/0182735 | A1 * | 8/2005 | Zager et al. | 705/67 |
| 2005/0198173 | A1 * | 9/2005 | Evans | 709/206 |
| 2005/0198176 | A1 * | 9/2005 | Landesmann | 709/206 |
| 2006/0101121 | A1 * | 5/2006 | Senechalle | 709/206 |
| 2006/0234675 | A1 * | 10/2006 | Flavin | 455/410 |
| 2007/0198644 | A1 * | 8/2007 | Noh | 709/206 |
| 2007/0266238 | A1 * | 11/2007 | Jancula | 713/156 |

FOREIGN PATENT DOCUMENTS

| WO | WO9910843 | * | 3/1999 |
|---|---|---|---|
| WO | WO 02/25464 | | 3/2002 |
| WO | WO0225464 | * | 3/2002 |

OTHER PUBLICATIONS

Rideau "Stamps Vs Spam. Postage as A Method to Eliminate Unsolicited Commercial Email", http://fare.tunes.org/, 15 P., 2002.

* cited by examiner

Primary Examiner—J Bret Dennison

(57) ABSTRACT

A protocol-based method for email forwarding by an email server is performed as follows. An initial email is received from a sender, and checked to ensure that the initial email includes a reusable electronic paying means. If the initial email carries a reusable electronic paying means, the initial email is forwarded to the recipient. An acceptance email containing a reusable electronic paying means is later received from the recipient of the initial email, and forwarded to the sender. Email not carrying an electronic paying means is rejected.

24 Claims, 7 Drawing Sheets

METHOD FOR DISCOURAGING UNSOLICITED BULK EMAIL

FIELD AND BACKGROUND OF THE INVENTION

The present embodiments relate to a method for discouraging unsolicited bulk email (spam) and, more particularly, to a method for discouraging spam using a protocol-based technique which imposes a financial penalty on the sender for email items rejected by their recipients.

Electronic mail (email) is now one of the primary ways people and organizations communicate with one another, with billions of emails being sent daily. Email support is offered by all online services and Internet Service Providers (ISPs). Email communication is extremely rapid. Email generally arrives at its destination, anywhere in the world, in minutes. More and more, businesses are relying on email to support commercial activities. For individuals, email has to a large extent replaced writing letters when communicating with friends and family.

With the rise of email has come a concurrent rise in the problem of spam. Spam, otherwise known as unsolicited bulk email (UBE) or unsolicited commercial email (UCE), is in the most simplistic terms electronic junk mail. Since sending an email item is essentially free, spammers are able to send hundreds and thousands of unsolicited emails. Indeed, many spammers do not necessarily ensure that the email addresses are valid. These spammers generate lists of addresses, based on general knowledge of common names and of email providers. When the spammer receives a response from a particular addressee the email address is known to be valid.

It is currently estimated that spam accounts for approximately 40% of all email traffic, with over 12 billion items being transmitted daily. Spam has serious financial implications, as well as personal ones. Internet providers are required to implement costly anti-spam measures, consequently raising the costs of Internet services. Companies lose workhours, as employees waste significant amounts of time dealing with spam at the workplace. Additionally, spam may contain content seen as offensive by the recipient, such as pornography, or may be an attempt to lure the recipient into a scam. It is estimated that U.S. corporations lost $8.9 billion dollars in 2002 due to spam, and that the cost to non-corporate emailers was $255 million.

A wide variety of measures are currently available to combat spam, and many others have been proposed. Current anti-spam techniques include many types of filters, which attempt to identify whether a given email item is legitimate or should be rejected as spam. Spasm filters include:

1. Domain-name filtering—A list is maintained containing the email addresses or domain name of known spammers. Email from senders on the list is rejected. Domain-name filtering is performed at a number of levels. At the email client level, users may maintain a blacklist. When a user receives a spam email, the user enters the spammers email address into the blacklist, either in his email client or his email service. Email coming from that address in the future is rejected. Email services monitor bulk emailings to their users, and attempt to distinguish between legitimate emailers and spammers. A number of public lists of known spammers are available. However, domain-name filtering has proven ineffective, since spammers generally change domain names frequently and are often able to hide their identity.

2. Content-based filtering—The content of an email item is examined to determine whether it is characteristic of spam, for example solicitation to view a pornographic site. Content filtering may be performed at many stages of email transmission, including by the email client, by the email service provider, or by a proxy email filtering service. Spammers are aware of content filtering, and take steps to ensure that the email content is not identifiably spam, for example by using random groupings of letters in the title or deliberately misspelled words.

3. Anti-spam regulations—The U.S. and other countries are beginning to introduce regulations and legislation intended to counter spam. These regulations are considered by many to be a mixed blessing, as they may hinder legitimate as well as illegitimate emailers. Additionally, spammers need only move their operations to an unregulated country to avoid prosecution.

Most of these anti-spam measures place the cost of avoiding spam on the recipient, who must proactively invest time and resources to ensure that he is not troubled by spam that is sent to his email address. A consensus is arising that the way to combat spam is to shift the cost of spam onto the spammers, by requiring email senders to invest a small amount of some resource for each email item sent. In "Stamps vs. Spam" (http://fare.tunes.org/articles/stamps_vs_spam.html-container1069), François-René Rideau discusses a number of proposed approaches.

Microsoft Corp. is promoting an approach known as the Penny Black method. The Penny Black method requires the sender to devote a small amount of computer resources for each email item sent. The computer performs a computation which takes several seconds (for example, producing a binary sequence) prior to sending each email item. For an individual user with ordinary amounts of email the "cost" of sending emails will be insignificant. However, bulk emailers will be obliged to devote large amounts of computer resources to sending emails. It is believed that this cost will discourage spammers, who will be reluctant to purchase and maintain large computer systems in order to send large quantities of unsolicited email. The Penny Black system has two disadvantages. Firstly, it places a large computational burden on legitimate bulk emailers, not just on spammers. Secondly, the economics of spam may be such that it is worthwhile for a spammer to make a one-time capital investment in a computer system that can then be dedicated to sending out spam.

A second proposal is a payment in human resources. The sender would be required to perform a small task for each email item sent. For example, the sender could be instructed by an automated reply from the recipient's software to connect to a web page and to perform a simple task known to be currently impossible for a computer to fulfill (a Turing test). However, payment in human resources is problematic for all legitimate senders of email, regardless of scale. Simplicity, rapidity, and ease of use are considered the great benefits of email. All of these benefits will be lost if the system requires the user to perform unnecessary and complex tasks. Additionally, the current solution may prevent elderly or disabled users from sending email, if they are not able to perform the required task.

A third proposed form of payment is monetary. The sender is required to pay a monetary charge for each email. A small monetary payment would be required for each sent email, which may or may not be refunded to the user if the recipient accepts the email. The charge should be small enough so as not to be a burden on individual and small-scale emailers. Spammers, however, will be financially unable to send out the massive amounts of email they are currently producing. The financially based methods in the related art require a large amount of processing by both users and email service providers, in order to manage an ongoing series of financial transactions. Many provide only a localized-solution for a number of users, which causes additional difficulties by requiring non-standard handling of email to these users. A number of financially based methods for discouraging spam are presented below.

Rideau describes a payment method in which each email item includes a certified check, to be drawn from the sender's account by the recipient or a receipt referring to a payment already done to the recipient's postage account. The recipient's postage software will then bank the check or ensure that the receipt is valid before accepting the email for actual processing.

Since email services are currently free, implementing a monetary charge for email requires establishing the necessary mechanisms to permit charging for email. Spam-proof email accounts are currently being offered to users by proxy email services such as CruelMail, LLC. The user sets a fee, and provides a list of email addresses that aren't subject to delivery fee. All other emailers must pay the required fee or their email is rejected. CruelMail collects the fee for the user filters out unwanted email. The user has the option of monitoring his rejected email, and manually retrieving email items he is interested in viewing, even if they have not paid the fee. CruelMail, and like services, are a local, not an encompassing solution for spam, and moreover, one that is paid for by the recipient. Moreover, the recipient may lose more than the fee paid to the anti-spam service. Email senders are unaccustomed to sending payments to their recipients, and are unlikely to cooperate. Friendly senders will often not want the bother of making even a symbolic payment to the recipient for the privilege of sending an email.

An alternative approach is offered by Goodmail Systems™, which offers an email stamping system. Accredited volume mailers purchase stamps, which can be attached to outgoing email. Participating Internet Service Providers (ISPs) install a stamp-filtering gateway, which clears email bearing a stamp and sends other email via a spam filter. Low-volume emailers may be offered no-cost stamps. However, this solution is also problematic because it applies only to the clients of ISPs which have installed a stamp-filtering gateway, and causes their email handling to be performed in a non-standard way. The current method does not eliminate spam; it only offers bulk emailers a way to bypass a spam filter. This bypass may be ignored by spammers who will continue to take their chances with the spam filter, as well as by bulk emailers who prefer to continue sending unstamped email via the ISPs spam filter.

Various payment schemes have been proposed for charging senders for emails. One such payment scheme is presented in U.S. Pat. No. 6,587,550 by Council et al. An incoming email is checked against a list of authorized parties (i.e. a whitelist). If the sending party is not on the list, an electronic billing agreement is emailed to the sending party indicating a fee that will be charged to the sending party in return for the message being provided to the intended receiving party. After the sender pays the fee, the email is delivered to the recipient. A second payment scheme is given in U.S. Pat. No. 6,697,462 by Raymond. Raymond's anti-spam technique requires senders to post a bond to accompany the communication. The bond is to be forfeited if the communication is rejected or deemed undesirable by the recipient.

The monetary anti-spam schemes proposed so far all require integrating sophisticated billing mechanisms into email services. The billing mechanism would be involved in virtually every email transaction, and would potentially be required to handle millions of micro-payments daily. Service providers may need to make costly investment in capital equipment and billing software, which costs will be passed on to their users. In order to limit the number of financial transactions, users will be required to maintain close control of their whitelists. Additionally, problems that arise during the payment process may require multiple communications between sender, recipient, and service provider in order to resolve financial issues, thus increasing the complexity and time required for email communications rather than reducing them.

There is thus a widely recognized need for, and it would be highly advantageous to have, an anti-spam method of email transmission, devoid of the above limitations.

SUMMARY OF THE INVENTION

According to a first aspect of the present invention there is provided a method for email forwarding by an email server that is performed as follows. An initial email is received from a sender, and checked to ensure that the initial email includes a reusable electronic paying means. If the initial email carries a reusable electronic paying means, the initial email is forwarded to the recipient. An acceptance email containing a reusable electronic paying means is later received from the recipient of the initial email, and forwarded to the sender. Email not carrying an electronic paying means is rejected.

Preferably, the reusable electronic paying means is an electronic stamp.

Preferably, the second reusable electronic paying means consists of the first reusable electronic paying means.

Preferably, the method includes the step of ensuring that the initial email includes an acknowledgement component prior to the forwarding, the acknowledgement component being for generating the acceptance email to the sender upon acceptance of the email by a recipient.

Preferably, the acknowledgement component is a script for querying the user for acceptance of the initial email and creating the acceptance email.

Preferably, the method includes the step of rejecting email not containing an electronic paying means.

Preferably, the method includes the step of selling a reusable electronic paying means to a user upon payment of a purchase fee.

Preferably, the method includes the step of refunding a user for an electronic paying means upon receipt of a refund request containing the electronic paying means.

Preferably, the electronic paying means is refundable for a refund amount equal to a purchase fee.

Preferably, the method includes the step of the electronic paying means is refundable for a refund amount less than a purchase fee.

Preferably, the electronic paying means is a digital signature in an email message header.

Preferably, the electronic paying means is a digital signature attached to the email.

Preferably, the electronic paying means includes a reusable portion and a non-reusable portion.

Preferably, the method includes the step of examining a non-reusable portion of the first electronic paying means to ensure that the first electronic paying means is valid for the initial email.

According to a second aspect of the present invention there is provided a method for email forwarding by an email server that is performed as follows. An initial email is received from a sender, and checked to ensure that the initial email includes a reusable electronic paying means and an acknowledgement component specifying a destination. The acknowledgement component is for use by the recipient in generating an acceptance email to the destination when the initial email is accepted. If the initial email carries a reusable electronic paying means, the initial email is forwarded to the recipient. An acceptance email containing a reusable electronic paying means is later received from the recipient of the initial email, and forwarded to the sender. Email not carrying an electronic paying means is rejected.

Preferably, the destination is the sender.

According to a third aspect of the present invention there is provided a method for email communication that is performed as follows. An initial email which includes a reusable electronic paying means is received from a sender. The electronic paying means is transferred to an electronic bank. It is then determined whether the initial email is accepted by the user. If the initial email is accepted by the user, an acceptance email, which includes a reusable electronic paying means retrieved from the electronic bank, is generated and returned to the sender.

Preferably, the method includes the step of generating the acceptance email using an acknowledgement component included in the initial email.

Preferably, the acknowledgement component specifies a destination for the acceptance email.

Preferably, the method includes the step of preventing generation of an acceptance email if the initial email is not accepted by the user.

Preferably, the acceptance email is generated without an acknowledgement component.

Preferably, the method includes the step of forming the second reusable electronic paying means from a combination of a reusable portion and a non-reusable portion identifying the acceptance email.

Preferably, the method includes the step of deleting the second electronic paying means from the electronic bank.

Preferably, the method includes the steps of: checking if the sender is on a forbidden sender list and automatically rejecting the initial email, if the sender is on the forbidden sender list.

Preferably, the method includes the steps of: checking if the sender is on a permitted sender list and automatically accepting the initial email, if the sender is on the permitted sender list.

Preferably, the method includes the step of purchasing a reusable electronic paying means from a paying means provider.

Preferably, the method includes the step of returning a reusable electronic paying means to a paying means provider for a refund.

According to a fourth aspect of the present invention there is provided a method for email communication which is performed as follows. An initial email which includes a reusable electronic paying means is received from a sender. It is then determined whether the initial email is accepted by the user. If the initial email is not accepted by the user, the electronic paying means is transferred to an electronic bank. If the initial email is accepted by the user, the reusable electronic paying means from the initial email is transferred to an acceptance email an acceptance email and returned to the sender.

Preferably, the method includes the step of generating the acceptance email using an acknowledgement component included in the initial email.

According to a fifth aspect of the present invention there is provided an email server, which includes a gateway and a forwarder, and is associated with a paying means provider for managing user purchases and refunds of electronic paying means. The gateway serves for rejecting email not containing a reusable electronic paying means and for approving email containing a reusable electronic paying means and an acknowledgement component, where the acknowledgement component is for generating an acceptance email to the sender upon acceptance of the email by a recipient. The forwarder forwards approved email from a sender to a recipient and forwards acceptance email from the recipient to the sender.

Preferably, the email server further includes interserver billing functionality, for balancing paying means sale and refund transactions with other email service providers.

Preferably, the gateway is further operable to approve acceptance email not containing an acknowledgement component.

Preferably, the electronic paying means includes a refundable and a non-refundable portion.

Preferably, the electronic paying means is a digital signature in an email message header.

Preferably, the electronic paying means is a digital signature attached to the email.

According to a sixth aspect of the present invention there is provided an email system, which includes a network of email servers and a paying means provider. Each of the email servers in the network contains a gateway, for rejecting email not containing a reusable electronic paying means and for approving email containing a reusable electronic paying means and an acknowledgement component, and a forwarder for forwarding an approved email from a sender to a recipient and for forwarding an acceptance email from the recipient to the sender. The acknowledgement component is used by the recipient to generate an acceptance email to the sender when the initial email is accepted by the recipient. The paying means provider manages user purchases and refunds of electronic paying means.

According to a seventh aspect of the present invention there is provided an email client, which includes an electronic bank, for storing reusable electronic paying means, an email receiver, and an email generator. The email receiver serves to receive an initial email containing a reusable electronic paying means from a sender, to transfer the electronic paying means to the electronic bank, and to determine if the initial email is accepted by a user. The email generator retrieves electronic paying means from the electronic bank, generates acceptance email containing the retrieved reusable electronic paying means, and sends the acceptance email to the sender.

Preferably, the email client further includes a user interface for querying the user for acceptance of the initial email and for and inputting a user response.

Preferably, the initial email further includes an acknowledgement component, and the email generator is operable to generate the acceptance email using the acknowledgement component.

Preferably, the email generator is further operable to retrieve a reusable electronic paying means from the electronic bank Preferably, the email generator is further operable to transfer an electronic paying means from an initial email to a respective acceptance email.

Preferably, the electronic bank is further operable to form the retrieved electronic paying means from a combination of a reusable portion stored in the electronic bank and a non-reusable portion identifying the acceptance email.

Preferably, the email receiver is further operable to reject the initial email, if the sender is on a forbidden sender list.

Preferably, the email generator is further operable to automatically accept the initial email, if the sender is on the permitted sender list.

Preferably, the email generator is operable to include the second electronic paying means in an email header.

Preferably, the email generator is operable to include the second electronic paying means in the email as an attachment.

According to a eighth aspect of the present invention there is provided an email client, which includes an electronic bank, for storing reusable electronic paying means, an email receiver, and an email generator. The email receiver serves to receive an initial email containing a reusable electronic paying means from a sender and to determine if a user accepts the initial email. The email generator generates acceptance email, transfers the electronic paying means from the initial email to the acceptance email, and sends the acceptance email to the sender.

According to a ninth aspect of the present invention there is provided a system for spam prevention including an email model and an enforcement unit. The email protocol defines an email to have a reusable electronic paying means and an acknowledgement portion. The acknowledgement portion is for returning the electronic paying means if the email is accepted and for deactivating the electronic paying means if the email is rejected. The enforcement unit is for location at intermediate servers over a network, and ensures that all passing email conforms to the model.

The present invention successfully addresses the shortcomings of the presently known configurations by providing a method for email communications in which email items are sent with a reusable electronic paying means. If the email is accepted or viewed by the user, an acceptance email is automatically or manually returned to the sender with a reusable electronic paying means. Otherwise, no acceptance email is returned, and the cost to the sender is the value of the reusable paying means. Since a spammer is expected to receive few acceptance emails relative to the number of email items they send, the cost to the spammer will be high.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
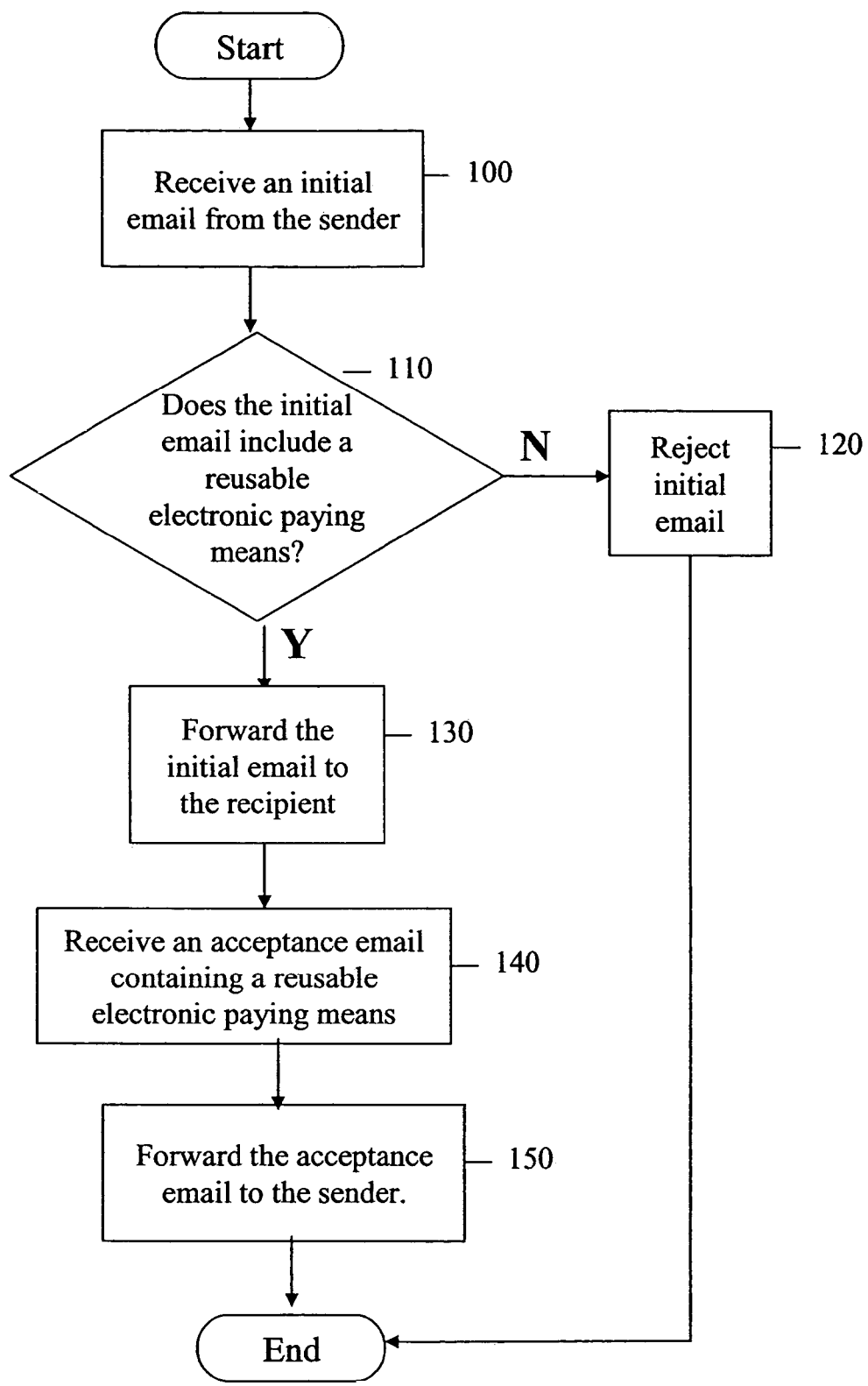
FIG. 1 is a simplified flowchart of a method for email forwarding by an email server, according to a preferred embodiment of the present invention.

The present embodiments are of a technique for discouraging unsolicited email communications using an email protocol which requires that email include a reusable electronic paying means, which is returned to the sender if the email is accepted (and/or viewed) by the recipient. Specifically, the present embodiments ensure that senders of email deemed unacceptable by the recipient pay a monetary penalty by forfeiting the electronic paying means.

Many proposals have been made for ways to penalize spammers by requiring bulk emailers to make a monetary payment of some kind for each email item they send. However, the proposed methods require the email service to add a costly billing system, for managing monetary transactions with their own users and with the users of other email services. A particularly problematic aspect of many of the current proposals is that they are to be implemented on a local basis, rather than as a general way for transmitting email over a network. Thus, senders whose email services lack the proper financial tools, will have difficulties including the monetary payment with transmitted emails, even if they are willing to do so. The present embodiments provide a solution which is implemented on a wide scale, possibly global, basis, and which obviates the need for multitudinous and complex accounting and financial transactions for both the users and the service providers.

The present embodiments enables senders to easily attach a monetary payment to emails, without requiring email services to institute complex financial tools in order to transfer money between users. The email protocol, which is adopted by all email servers on the network, requires that all email items be sent with a reusable paying means. The reusable paying means is purchased by users from their email service or from a centralized agency, and may be returned by the user for a refund. Each user maintains an electronic bank for the reusable paying means. The user attaches a reusable electronic paying means to each outgoing email. The user has the prerogative to accept or reject incoming email items. If an email is rejected, the reusable paying means from the rejected email is transferred to the recipient's electronic bank and the sender forfeits the price of the paying means. If the email is accepted, an acceptance email is returned to the sender carrying a reusable paying means, preferably of an equal or slightly lesser value, is returned to the sender, so that the sender is effectively not charged for sending the email.

The basic financial transactions required of each email service are selling electronic paying means to their users, providing refunds for paying means no longer needed by their users, and to balancing the proceeds from paying means sales and refunds with other networks. The billing functionality may be simplified further if a centralized financial infrastructure is set up for the benefit of several email services or the entire network.

As for the user, the current functions of the mail user agent (denoted herein the email client) are expanded to include managing a bank of reusable electronic paying means, and returning acceptance email carrying an electronic paying means for emails accepted by the recipient.

The principles and operation of a method and server for email forwarding according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified flowchart of a method for email forwarding by an email server, according to a preferred embodiment of the present invention. The present embodiment is of an email protocol which is implemented in the entire email network, to ensure that mail is forwarded from a sender to a recipient only if it carries an electronic paying means. The electronic paying means is reusable, that is an electronic paying means on an email item received by the recipient may later be included in an email item sent by the recipient. The recipient is therefore not required to purchase a new paying means for every outgoing email, only when the quantity of his outgoing email exceeds that of his incoming mail. By allowing paying means reuse, the present embodiment reduces the number of financial transaction required between the users and the email server financial system.

In step 100, an initial email is received from the sender, for forwarding to a specified recipient. The initial email is checked in step 110, to determine that it includes a reusable electronic paying means. In the preferred embodiment, email not containing an electronic paying means is rejected, in step 120. The sender may be notified and given another opportunity to provide an electronic paying means for the initial email.

The electronic paying means may be included in the email by any method known in the art. In a first preferred embodiment, the electronic paying means consists of a reusable electronic stamp. The stamp is preferably implemented as a digital signature provided as an attachment to the initial email and/or as a digital signature inserted into the email header. Alternately, a new email protocol may establish an email format which includes a provision for including an electronic stamp.

If it is determined in step 110 that the initial email contains a reusable electronic paying means, the initial email is forwarded to the recipient in step 130.

In step 140, an acceptance email containing a reusable electronic paying means is received from the recipient of the initial email, for forwarding to the sender of the initial email. In a first preferred embodiment, the electronic paying means on the acceptance email is the same electronic paying means that was sent with the initial email. In an alternate preferred embodiment, the acceptance email contains a valid electronic paying means not necessarily taken from the initial email.

In step 150, the acceptance email is forwarded to the sender. An electronic paying means is thus returned to the sender, compensating the sender for the electronic paying means sent with the initial email. The sender thus pays a penalty only for emails that were rejected by the recipient, since no acceptance email is returned.

The following embodiments present are directed to a non-limiting example in which the electronic paying means consists of an electronic stamp. The example is presented for illustration only. The presented preferred embodiments are adaptable to any type of reusable electronic paying means.

In the preferred embodiment, the initial email is checked to ensure that an acknowledgement component is included, in addition to the reusable stamp. The acknowledgement component may be used by the recipient's email client in order to generate an acceptance email to the sender.

In a first preferred embodiment, the acknowledgement component is a macro or script provided in the email, for automatic creation and sending of the acceptance email. In another preferred embodiment, the acknowledgement component records the email address from which the initial email originated, which is used as the destination of the acceptance email. In yet another preferred embodiment, the acknowledgement component specifies a destination for sending the acceptance email, which is not necessarily the sender. The present embodiment is suitable for organizations which maintain a centralized electronic bank for the use of multiple members of the organization. The acknowledgement component may thus direct the acceptance email to the centralized electronic bank rather than to the individual sender.

It is desirable that a second acceptance email not be generated by the sender's email client in response to receiving an acceptance email from the recipient. Sending an acceptance email for every incoming email would create a long stream of acceptances bouncing back and forth from the sender to the recipient. The email client should therefore be able to distinguish between regular incoming email and acceptance emails. This distinction may be achieved by ensuring that acceptance email does not include an acknowledgement component. In the preferred embodiment, acceptance email is not checked for an acknowledgement component before being forwarded to the sender.

It is important to ensure that a user is not able to use a single digital stamp on multiple email items. In the preferred embodiment, each electronic stamp contains a reusable portion and a non-reusable portion, which contains information identifying the email it is attached to. Preferably, whenever an email is forwarded, a further check is made of its electronic stamp to ensure that the electronic stamp corresponds to the email currently being processed. Identical electronic stamps are thus prevented from being applied to multiple email items.

Separation of the electronic stamp into a reusable and a non-reusable portion provides a simple way for a service provider to impose a small charge on email senders for each email item sent, regardless of whether the email is accepted or rejected by the recipient. A separate fee is charged by a stamp provider (more generally, the paying means provider) for the reusable and non-reusable portions of the electronic stamp. When an initial email is sent, the value of the non-reusable portion is retained by the service provider, thus serving as a transfer fee that is paid by the sender to the email service provider for every initial email.

Preferably, the method contains the further step(s) of selling electronic stamps to users upon payment of a purchase fee and/or refunding users for stamps that are returned. In a first preferred embodiment, the user is refunded the entire value of the stamp. In a second preferred embodiment, the user is refunded an amount lower than the purchase fee, and the difference is retained by the email service provider. Legitimate bulk emailers, such as government agencies, may be accommodated by using no-cost or low-cost electronic stamps, so that the initial financial investment required in order to send out a large number of emails is eliminated or minimized.

Figure 2:
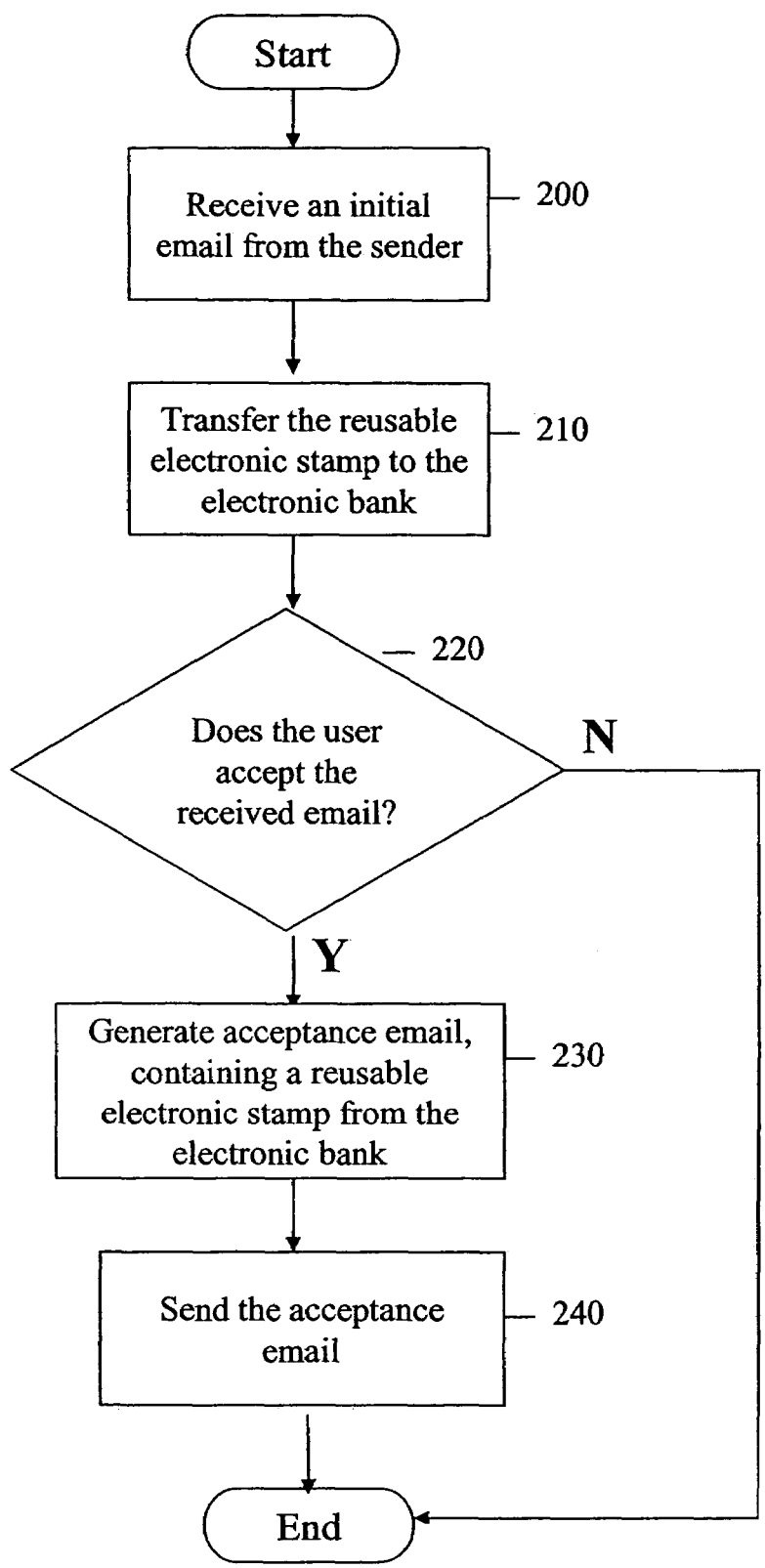
FIG. 2 is a simplified flowchart of a method for email communication by the email recipient, according to a first preferred embodiment of the present invention.

Reference is now made to FIG. 2, which is a simplified flowchart of a method for email communication, according to a first preferred embodiment of the present invention. The present embodiment is details the processing of incoming email by the recipient in accordance with the abovedescribed email protocol.

In step 200, an initial email is received from a sender. The initial email carries a reusable electronic stamp. Note that it is generally not necessary for the recipient to check that the initial email carries the electronic stamp, since implementing the present email protocol at the server (as described above) ensures that all email transported over the network carries an electronic stamp.

In step 210, the reusable electronic stamp from the initial email is transferred to the recipient's electronic bank. Each user has an electronic bank, which is a repository for electronic stamps. Electronic stamps are entered into the electronic bank either when purchased by the user or when received on incoming email. Electronic stamps are removed from the electronic bank either for inclusion in an outgoing email, or for return for a refund. Careful stamp management is performed to ensure that a reusable electronic stamp is not duplicated and used on multiple email items.

In step 220, it is determined whether the recipient accepts the initial email. Acceptance may be obtained explicitly by querying the recipient for acceptance. Additionally or alternatively, the user may provide accept the email implicitly by viewing the initial email. If the initial email is not accepted, the method ends. Since no acceptance email is returned to the sender, the sender forfeits the electronic stamp which was included in the initial email.

Preferably, the initial email includes an acknowledgement component, which is used for generating the acceptance email in step 230. In a preferred embodiment, the acceptance email is automatically returned to the originating email address from which the initial email was sent. In an alternate preferred embodiment, the acknowledgement component specifies a destination for the acceptance email, so that the sender can direct the acceptance email to the desired electronic bank. Default behavior may be to return the acceptance email directly to the originating address when the acknowledgement component does not explicitly specify a destination.

If the initial email is accepted, an acceptance email is generated in step 230. The acceptance email includes a reusable electronic stamp retrieved from the electronic bank. In the preferred embodiment, the acceptance email is generated without an acknowledgement component. The presence or absence of an acknowledgement component can thus be used to determine whether an incoming email is new, and should be examined for acceptance, or if it is an acceptance email returning a stamp to the user, in which case the stamp is returned to the electronic bank and no further processing is required.

Preferably the method includes the further step of deleting the electronic stamp from the electronic bank to prevent duplication. In step 240, the acceptance email is sent to the sender.

In the preferred embodiment, electronic stamps contain a reusable portion and a non-reusable portion. In the present embodiment, storing and retrieving stamps refers to storing and retrieving the reusable portions. When an email is generated, the electronic stamp included in the generated email is formed from a non-reusable portion identifying the current email, and combined with a reusable portion taken from the electronic bank. In the case of an acceptance email, the acceptance email is sent with an electronic stamp formed from a non-reusable portion identifying the acceptance email and a reusable portion either retrieved from the electronic bank or taken directly from the reusable stamp received with the initial email.

Figure 3A:
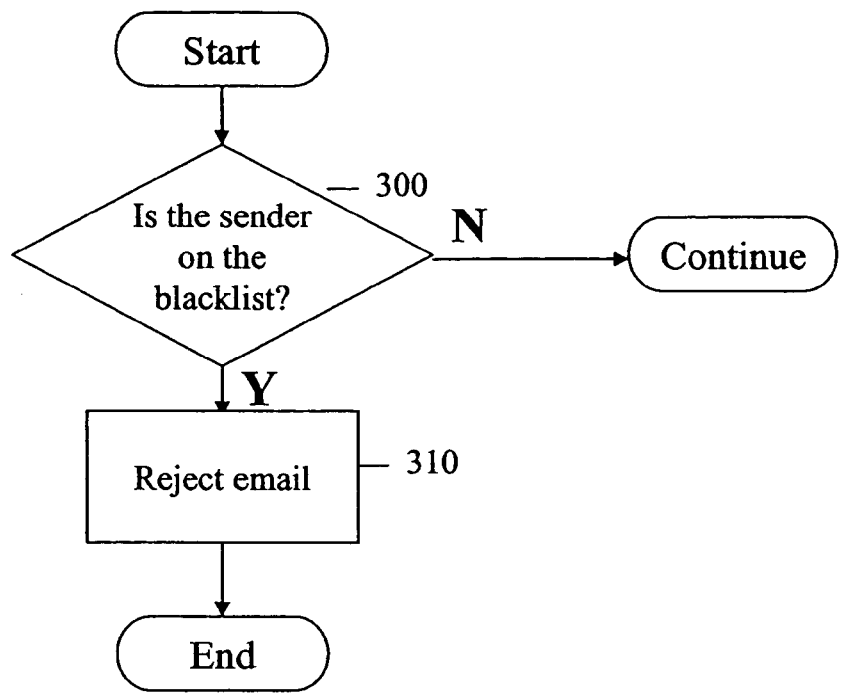
FIG. 3a is a simplified flowchart for blacklisting, according to a preferred embodiment of the present invention.

Processing of incoming email may be expedited by whitelisting or blacklisting techniques. Reference is now made to FIG. 3a, which is a simplified flowchart for blacklisting, according to a preferred embodiment of the present invention. The recipient maintains a forbidden sender list (denoted herein a blacklist), which contains details about senders whose email communications are not welcome. After the initial email is received (step 200 above), the sender details (for example, email address or name) are checked against the blacklist in step 300. If the sender is on blacklist, the initial email is automatically rejected in step 310 and no acceptance email is sent.

Figure 3B:
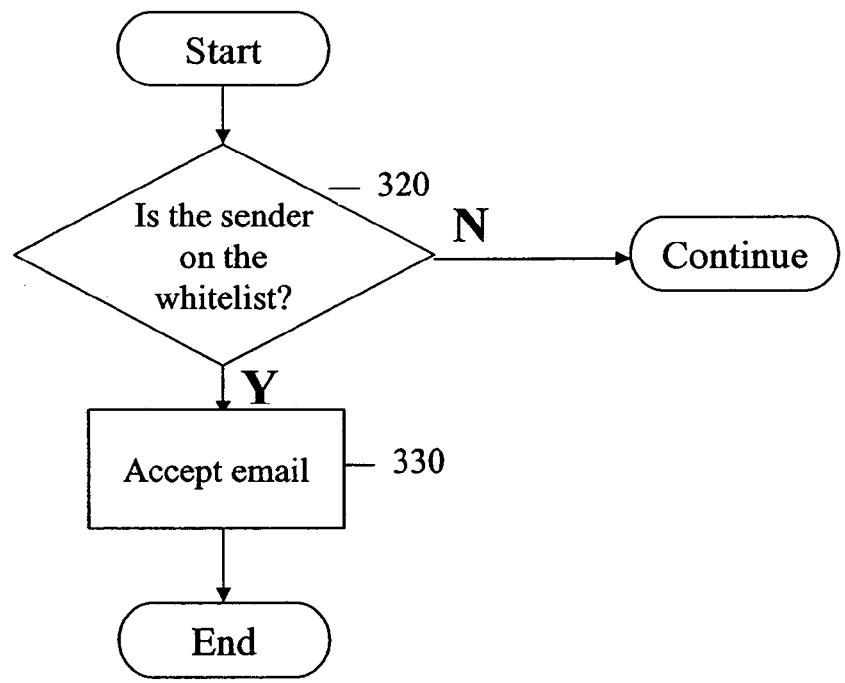
FIG. 3b is a simplified flowchart for white listing, according to a preferred embodiment of the present invention.

Reference is now made to FIG. 3b, which is a simplified flowchart for whitelisting, according to a preferred embodiment of the present invention. The recipient maintains a permitted sender list (denoted herein a whitelist), which contains details about senders whose email communications are always welcome. After the initial email is received, the sender details are checked against the whitelist in step 320. If the sender is on the whitelist, an acceptance email is automatically generated in step 330, without requiring an explicit or implicit acceptance from the recipient.

Preferably, the method includes the further step of purchasing a reusable stamp from a stamp provider.

Preferably, the method includes the further step of returning a reusable stamp to a stamp provider for a refund.

Figure 4:
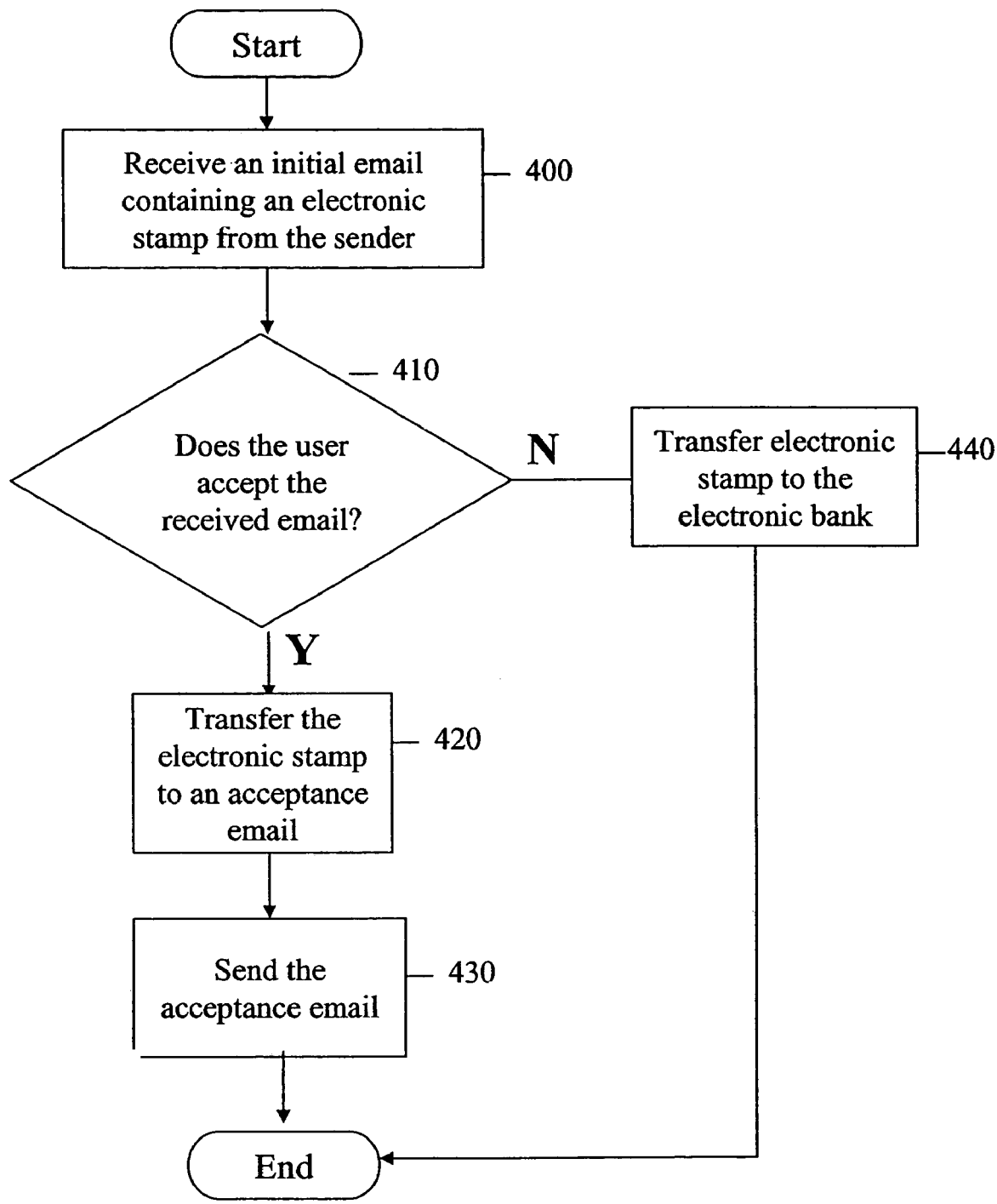
FIG. 4 is a simplified flowchart of a method for email communication by the email recipient, according to a second preferred embodiment of the present invention.

Reference is now made to FIG. 4, which is a simplified flowchart of a method for email communication by the email recipient, according to a second preferred embodiment of the present invention. In the current embodiment the electronic stamp is transferred directly from the incoming initial email to the acceptance email, without going through the electronic bank. In step 400, an initial email which includes a reusable electronic stamp is received from a sender. In step 410, the recipient is queried for acceptance of the initial email. If the initial email is accepted, the electronic stamp from the initial email is transferred to an acceptance email in step 420, and the acceptance email is sent to the sender in step 430. If the initial email is rejected by the recipient, the electric stamp from the initial email is transferred to the recipient's electronic bank in step 440, and no acceptance email is sent.

Figure 5:
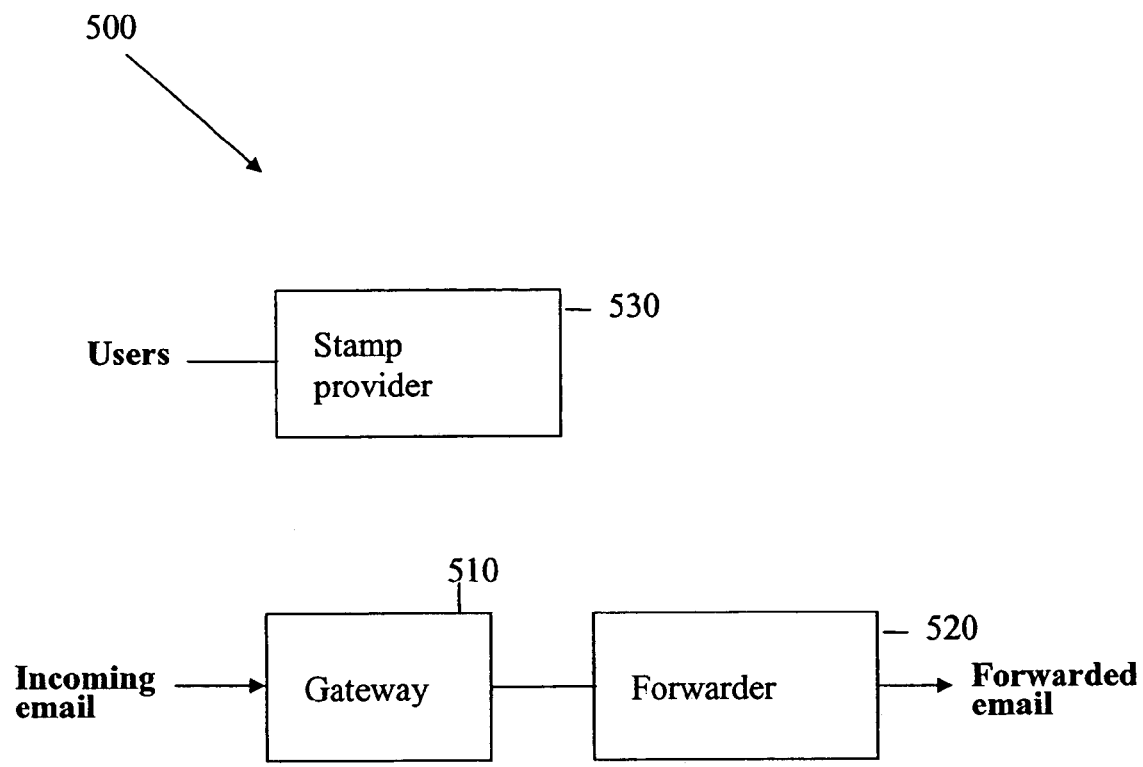
FIG. 5 is a simplified block diagram of an email server, according to a preferred embodiment of the present invention.

Reference is now made to FIG. 5, which is a simplified block diagram of an email server, according to a preferred embodiment of the present invention. Email server 500 contains gateway 510 and forwarder 520, which direct email communications between users. Email server 500 is associated with a provider of electronic paying means denoted herein stamp provider 530, which is a source for purchasing and returning reusable electronic paying means. It is again noted that references to electronic stamps are non-limiting and that the present embodiments apply to any form of reusable electronic paying means.

Gateway 500 examines incoming email from users, approves email containing a reusable electronic stamp and an acknowledgement component, and rejects email that does not contain a reusable stamp. Preferably, gateway 520 also approves acceptance email that includes a reusable electronic stamp but does not include an acknowledgement component. Email without an electronic stamp is rejected. Forwarder 520 forwards approved email to a specified destination. (In the case of an initial email, the specified destination is the email recipient. In the case of an acceptance email, the specified destination is the sender of the initial email or the destination that was specified on the acknowledgement component of the corresponding initial email.)

Stamp provider 530 manages stamp purchase and refund transactions with users. Stamp provider 530 may be associated with email server 500 either directly or indirectly. Direct association includes stamp provider 530 being incorporated into the email server and/or being an additional service of the email service provider. Indirect association includes stamp provider 530 being a part of another email service provider, being connected to email server 500 over a data network, and/or being a separate entity having a financial relationship to the email service provider.

Stamp provider 530 preferably has additional interserver billing functionality, for balancing stamp sale and refund transactions between email service providers. Since stamps may be transferred between users of different email servers, an imbalance may occur when one of the servers is required to refund an email stamp originally purchased from a different server. The electronic stamp should therefore identify the server from which it was originated, so that each server can keep track of the amounts other servers owed to it by other servers.

Figure 6:
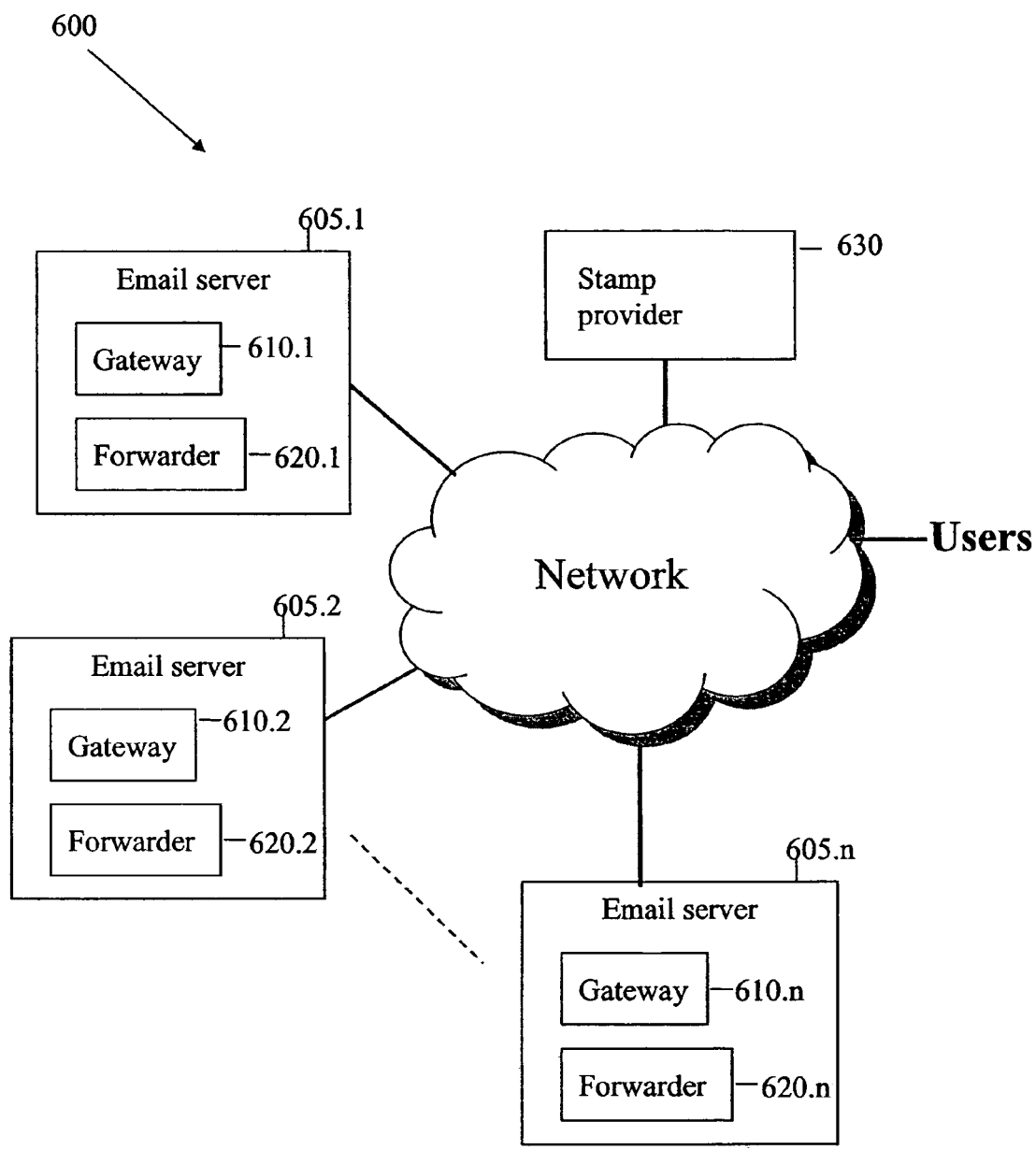
FIG. 6 is a simplified block diagram of an email system, according to a preferred embodiment of the present invention.

Reference is now made to FIG. 6, which is a simplified block diagram of an email system, according to a preferred embodiment of the present invention. Email system 600 has a network of email servers, 605.1 to 605.*n*, and a central stamp provider 620. Each email server 605.*x* contains gateway 610.*x* and forwarder 620.*x*, which operate essentially as described above for FIG. 5. Stamp provider 630 performs electronic stamp purchase and refund transactions with the users of all of the servers in the network. Maintaining a central stamp provider for multiple servers reduces the quantity and complexity of the financial transactions required, by eliminating the need for interserver billing between the servers in the network.

Figure 7:
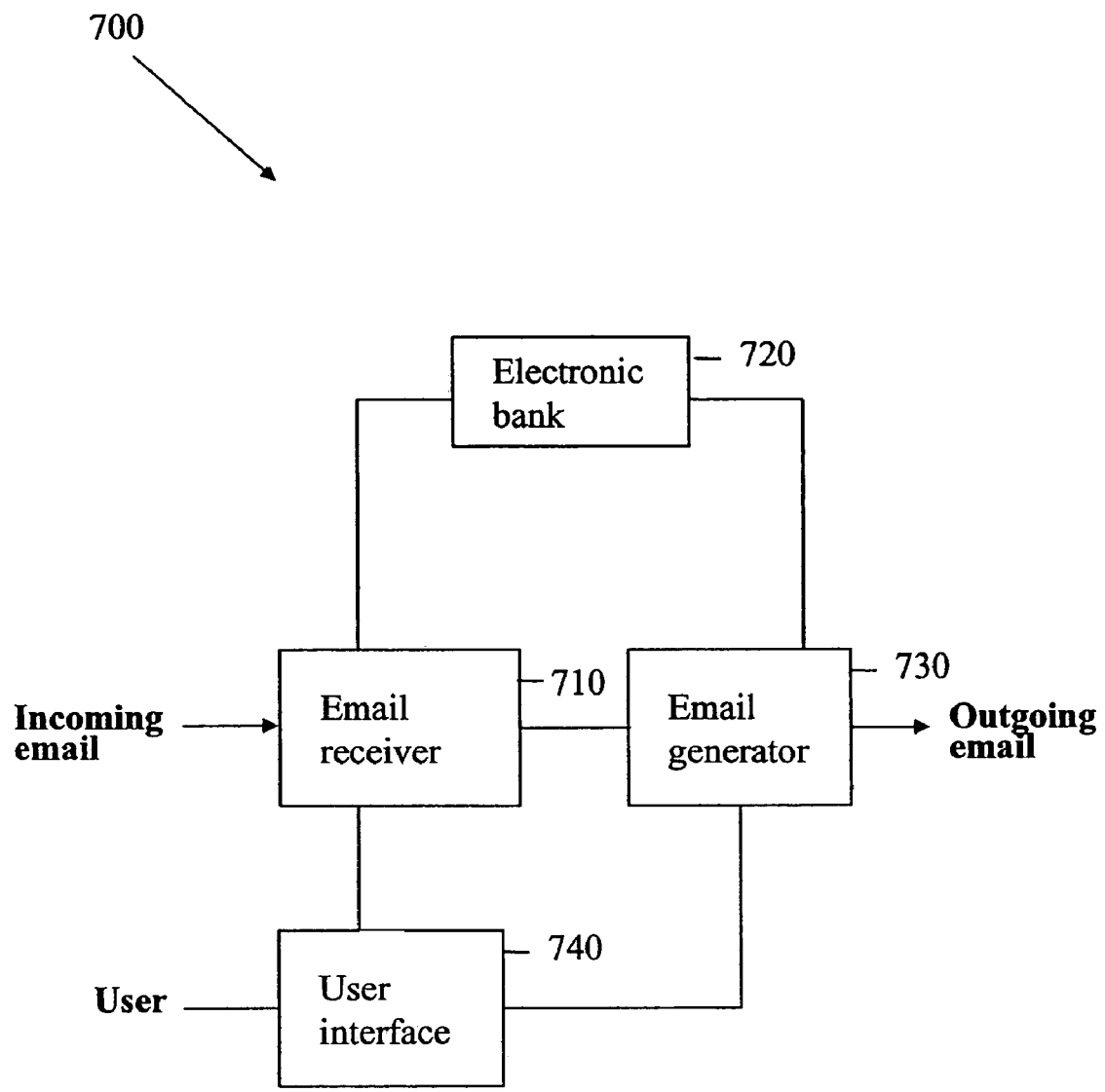
FIG. 7 is a simplified block diagram of an email client, according to a preferred embodiment of the present invention.

Reference is now made to FIG. 7, which is a simplified block diagram of an email client, according to a preferred embodiment of the present invention. Email client 700 is responsible for maintaining an electronic bank and for generating acceptance emails. Email client 700 contains email receiver 710, electronic bank 720, and email generator 730. Email client 700 preferably further provides standard MUA functionality, including reading, composing, disposing, printing and displaying e-mail messages.

Email receiver 710 receives incoming email, which may consist of regular email communications from other senders or returning acceptance emails. Both types of incoming email items are expected to include a reusable electronic stamp. When an acceptance email is received, email receiver 710 transfers the electronic stamp into electronic bank 720 and disposes of the acceptance email. When an initial email is received from another sender, email receiver 710 first determines whether the user accepts the initial email. If the initial email is rejected, email receiver 710 transfers the electronic stamp into electronic bank 720 and disposes of the initial email. If the user accepts the initial email, email receiver 710 notifies email generator 730 that an acceptance email should be returned to the sender.

In the preferred embodiment, the incoming initial email contains an acknowledgement component which is used by email generator 730 to create the acceptance email.

Electronic bank 720 is a repository for storing electronic stamps. Electronic stamps are deposited in electronic bank 720 when they are purchased from the email service provider (or a centralized stamp provider), or are transferred from incoming emails by email receiver 710. Stamps are removed from electronic bank 720 when they are returned to the service provider for a refund or are used for outgoing email. Electronic bank 720 ensures that an electronic stamp is available for use only once after being deposited, so that a single electronic stamp cannot be duplicated by the user for repeated use without further payment.

In the preferred embodiment, the electronic stamp consists of a reusable portion and a non-reusable portion. Electronic bank 720 then stores only the reusable portions, and generates electronic stamps for inclusion in an outgoing email from a stored reusable portion and an identifier of the outgoing email.

Email generator 730 generates and sends outgoing email. A reusable electronic stamp is included in all outgoing email. In particular, email generator 730 ensures that an acceptance email is created and sent when notified by email receiver 710 that an incoming initial email has been accepted by the user. In a first preferred embodiment, acceptance email is generated automatically by email generator 730 upon acceptance of the incoming email by the user. In another preferred embodiment, email client 700 is configured to enable a user to generate and send an acceptance email manually. The acceptance email includes an electronic stamp, which is either retrieved from electronic bank 720 or transferred from the accepted initial email.

Email generator 730 may also check a whitelist to determine whether an incoming initial email should be automatically accepted and/or a blacklist to determine whether an incoming initial email should be automatically rejected.

In a preferred embodiment, email generator 730 includes the reusable electronic stamp retrieved from the initial email in the header of the acceptance email. In another preferred embodiment, email generator 730 includes the reusable electronic stamp retrieved from the initial email as an attachment to the acceptance email.

In the preferred embodiment, email client 700 also has user interface 740, for querying the user whether the initial email is accepted and inputting the user's response.

An additional preferred embodiment of the present invention is a system for spam prevention which includes an email model similar to the email protocol discussed above and an enforcement unit which ensures that all passing email conform to the model. The email model defines an email to have a reusable electronic stamp and an acknowledgement portion. The acknowledgement portion serves to return the stamp to the sender if the email is accepted, and deactivates the stamp if the email is rejected, thereby preventing the stamp from being returned to the sender. Stamp deactivation may be performed, for example, by having the recipient retain the electronic stamp, by returning the electronic stamp to the stamp provider, or by having the electronic stamp remain at the email service provider. Enforcement units may be located at intermediate servers over a network, in order to monitor email traffic over the network.

The abovedescribed embodiments provide a protocol-based measure which effectively discourages spam by imposing a financial penalty on the spammer. Implementing the abovedescribed anti-spam embodiments as an email protocol simplifies the task of the email server. The email server simply provides standardized treatment to all email to ensure that the email includes an electronic paying means. Reusability of the electronic paying means provides a way to levy a financial charge for sending email without requiring complex financial transactions required. A portion of the charge may be retained by the service provider, thus making it financially worthwhile for service providers to adopt the anti-spam protocol. The present embodiments thus give a practical and easily implementable solution to eliminating spam.

It is expected that during the life of this patent many relevant email clients, email servers, email networks, and email protocols will be developed and the scope of the corresponding terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An email server operating in communication with a computer, operative to forward an initial email transmitted in association with a reusable email stamp from a sender to a recipient, wherein said email stamp is transferable by said recipient into a bank of email stamps and retrievable by said recipient from said bank for reuse by transmission in association with an outgoing email from said recipient to a third party.

2. An email server according to claim 1, wherein said reuse further comprises returning said email stamp to said sender, upon acceptance of said email by said recipient.

3. An email server according to claim 1, wherein said email stamp is retainable by said recipient if said email is not accepted.

4. An email server according to claim 1, further operative to make delivery of said initial email conditional upon the inclusion of an email stamp with said initial email.

5. An email server according to claim 1, wherein said email stamp further comprises an acknowledgement component operative to automatically generate an acceptance email for returning said email stamp to said sender for reuse, upon acceptance of said initial email by said recipient.

6. An email server according to claim 5, wherein said acknowledgement component comprises a script for querying a recipient for acceptance of said email.

7. An email server according to claim 5, wherein said acknowledgement component is further operable to transfer said email stamp from said initial email to said acceptance email.

8. An email server according to claim 1, wherein an email stamp comprises a digital signature in an email message header.

9. An email server according to claim 1, wherein an email stamp comprises a digital signature attached to said email.

10. An email server according to claim 1, wherein said email stamp further comprises a non-reusable portion identifying said email, thereby to assure a validity of said email stamp.

11. A method comprising:
receiving payment for an email stamp from a user; and
providing a reusable email stamp to said user, wherein said email stamp is operative to be transmitted in association with an email sent by said user to a recipient, and wherein said email stamp is transferable upon receipt by said recipient into a bank of email stamps and retrievable by said recipient from said bank for reuse by transmission in association with an outgoing email from said recipient.

12. A method according to claim 11, wherein said reuse further comprises returning said email stamp to said user, upon acceptance of said email by said recipient.

13. A method according to claim 11, wherein said outgoing email comprises an email sent by said recipient to a third party.

14. A method according to claim 11, wherein said email stamp is further operative to be retained by said recipient in said bank, for reuse if said email is not accepted.

15. A method according to claim 11, further comprising refunding said user for an email stamp upon receipt of a refund request comprising said email stamp, after said stamp has been used.

16. A method according to claim 15, wherein said email stamp is refundable for a refund amount equal to a purchase fee.

17. A method according to claim 15, wherein said email stamp is refundable for a refund amount less than a purchase fee.

18. A method comprising:
sending an initial email to an email server, for forwarding to a recipient;
if said email comprises a reusable email stamp, forwarding said initial email to a specified recipient;
transferring said reusable email stamp into a bank of email stamps, if said initial email is not accepted;
retrieving said reusable email stamp from said bank of email stamps; and
reusing said retrieved email stamp for transmission in association with an outgoing email from said recipient to a third party.

19. A method according to claim 18, wherein said reusing comprises transferring said reusable email stamp to an acceptance email for return to said sender, if said recipient accepts said email.

20. A method according to claim 18, further comprising rejecting email not comprising an email stamp.

21. A method according to claim 18, wherein said email stamp comprises a non-reusable portion, said method further comprising examining said non-reusable portion to ensure that said email stamp is valid for said initial email.

22. A method according to claim 21, further comprising rejecting said initial email, if said email stamp is invalid.

23. An email server according to claim 1, further operative to ensure that said email stamp was issued upon receipt of a payment, prior to performing said forwarding.

24. An email server according to claim 1, further operative to ensure that said email stamp comprises a portion identifying said associated email, thereby to determine a validity of said stamp.

* * * * *